(12) United States Patent
Kenney et al.

(10) Patent No.: US 10,006,722 B2
(45) Date of Patent: Jun. 26, 2018

(54) STRUCTURAL SUPPORT ELEMENT IN HEAT EXCHANGERS

(71) Applicant: Dana Canada Corporation, Oakville (CA)

(72) Inventors: Ben Kenney, Toronto (CA); Nik Vucenic, Hamilton (CA); Doug Vanderwees, Mississauga (CA)

(73) Assignee: Dana Canada Corporation, Oakville, Ontario (CA)

( * ) Notice: Subject to any disclaimer, the term of this patent is extended or adjusted under 35 U.S.C. 154(b) by 62 days.

(21) Appl. No.: 15/337,004

(22) Filed: Oct. 28, 2016

(65) Prior Publication Data

US 2017/0122679 A1    May 4, 2017

Related U.S. Application Data

(60) Provisional application No. 62/247,858, filed on Oct. 29, 2015.

(51) Int. Cl.

| | |
|---|---|
| *H01M 10/613* | (2014.01) |
| *F28F 9/007* | (2006.01) |
| *H01M 10/625* | (2014.01) |
| *H01M 10/6555* | (2014.01) |
| *F28F 3/08* | (2006.01) |

(Continued)

(52) U.S. Cl.
CPC .............. *F28F 9/0075* (2013.01); *F28F 3/08* (2013.01); *F28F 3/10* (2013.01); *H01M 10/613* (2015.04); *H01M 10/625* (2015.04); *H01M 10/647* (2015.04); *H01M 10/6555* (2015.04); *H01M 10/6557* (2015.04); *H01M 10/6567* (2015.04); *F28F 3/12* (2013.01); *F28F 9/028* (2013.01);

(Continued)

(58) Field of Classification Search
CPC .......................... H01M 10/613; H01M 10/625
See application file for complete search history.

(56) References Cited

U.S. PATENT DOCUMENTS

| 4,254,827 A | 3/1981 | Forster et al. |
|---|---|---|
| 6,017,648 A | 1/2000 | Jones |

(Continued)

FOREIGN PATENT DOCUMENTS

| CA | 2358890 A1 | 4/2002 |
|---|---|---|
| EP | 0864837 A2 | 9/1998 |
| WO | 2012126111 A1 | 9/2012 |

OTHER PUBLICATIONS

International Search Report and Written Opinion for Application No. PCT/CA2016/051246, dated Jan. 10, 2017, issued by the Canadian Intellectual Property Office.

*Primary Examiner* — Olatunji Godo
(74) *Attorney, Agent, or Firm* — Marshall & Melhorn, LLC

(57) ABSTRACT

A heat exchanger made up of a plate pair defining a flow passage. The flow passage fluidly coupled to a fluid inlet at a first end and a fluid outlet at a second end for flow of fluid from the fluid inlet to the fluid outlet. The heat exchanger further contains a structural support element sandwiched between the plate pair. The structural support element has a first structural support element aperture and one or more channels extending from the first structural support element aperture to a peripheral edge of the structural support element, and wherein the structural support element is positioned circumferentially around the fluid inlet with the first structural support element aperture aligned with the fluid inlet, with the channels permitting flow of the fluid from the fluid inlet to the flow passage.

25 Claims, 13 Drawing Sheets

(51) Int. Cl.
*F28F 3/10* (2006.01)
*H01M 10/647* (2014.01)
*H01M 10/6557* (2014.01)
*H01M 10/6567* (2014.01)
*F28F 3/12* (2006.01)
*F28F 9/02* (2006.01)

(52) U.S. Cl.
CPC ....... *F28F 2230/00* (2013.01); *F28F 2265/00* (2013.01); *H01M 2220/20* (2013.01)

(56) References Cited

U.S. PATENT DOCUMENTS

| | | |
|---|---|---|
| 7,552,520 B2 | 6/2009 | Wink et al. |
| 8,596,343 B2 | 12/2013 | Christensen et al. |
| 8,857,504 B2 | 10/2014 | Christensen et al. |
| 2006/0172177 A1 | 8/2006 | Scherer et al. |
| 2006/0220327 A1 | 10/2006 | Russell |
| 2007/0241516 A1 | 10/2007 | Efremov |

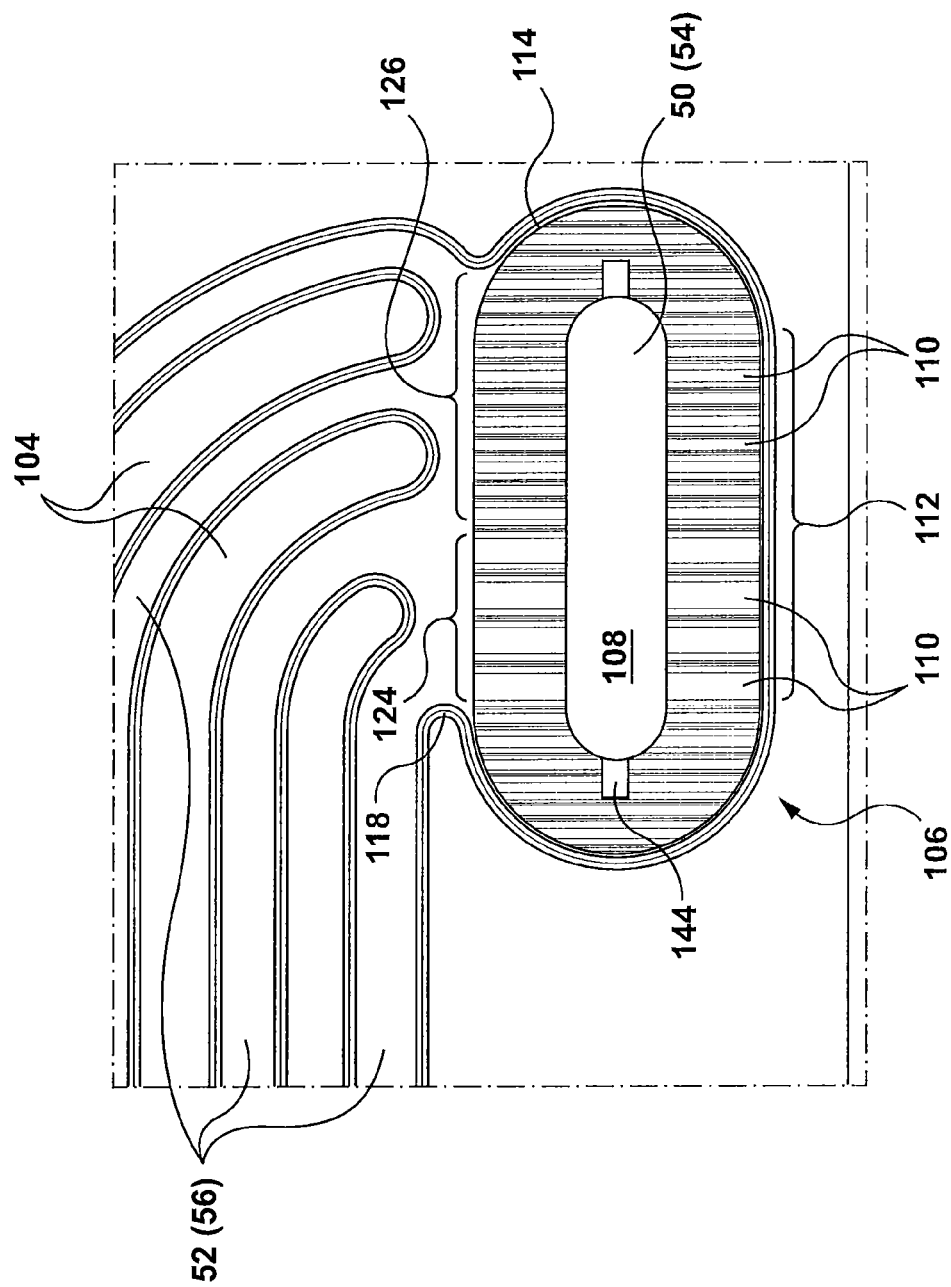

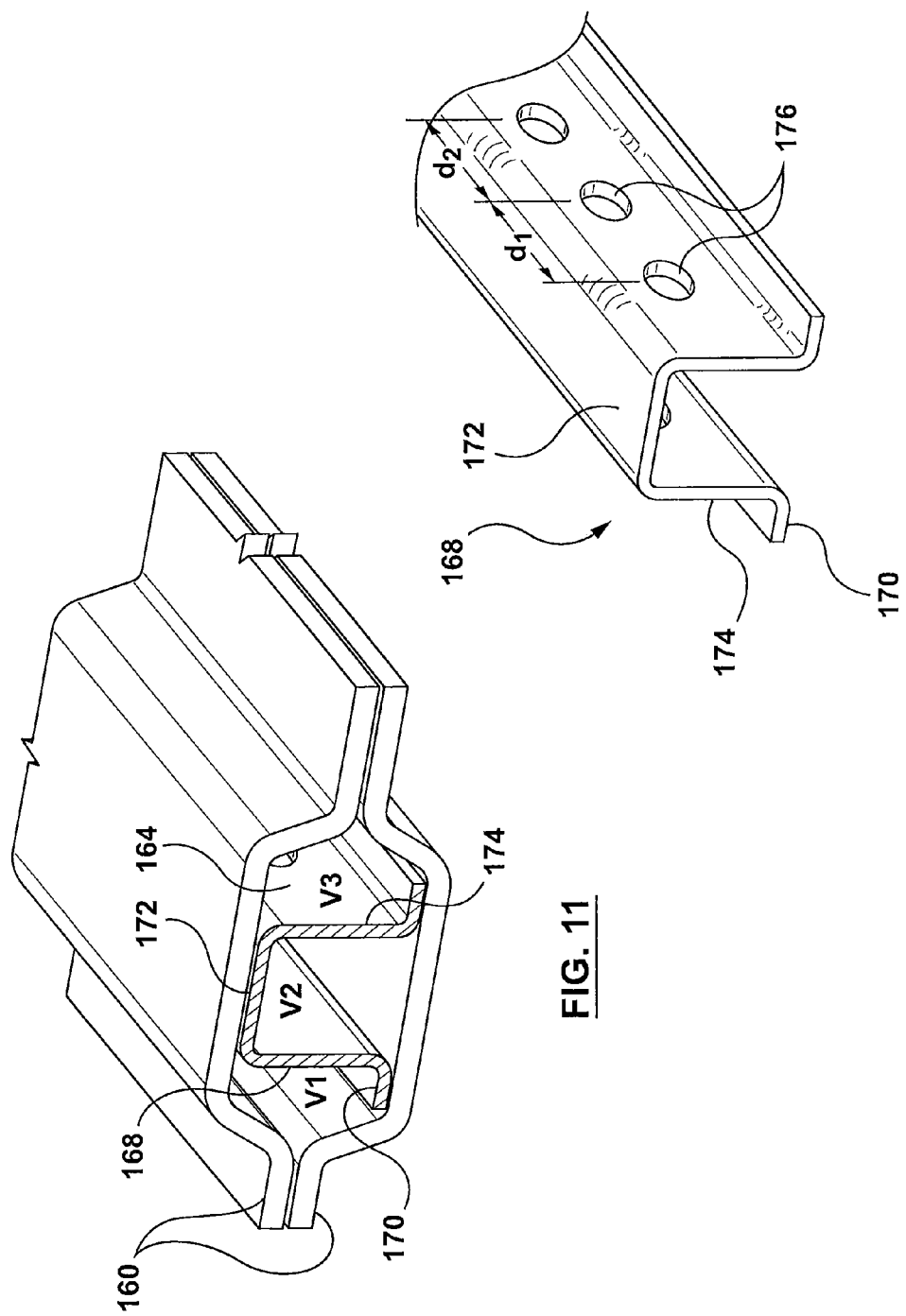

STRUCTURAL SUPPORT ELEMENT IN HEAT EXCHANGERS

CROSS-REFERENCE TO RELATED APPLICATION

This application claims the benefit of and priority to U.S. Patent Provisional Application No. 62/247,858 filed Oct. 29, 2015 under the title A STRUCTURAL SUPPORT ELEMENT ENABLING FACE SEALS IN BATTERY COOLERS. The content of the above patent application is hereby expressly incorporated by reference into the detailed description hereof.

FIELD

The specification relates to a heat exchanger. In particular, the specification relates to a battery cooler, and more particularly, a battery cooler having a structural support element.

BACKGROUND

Rechargeable batteries such as batteries made up of many lithium-ion cells can be used in many applications, including for example in electric vehicle ("EV") and hybrid electric vehicle ("HEV") applications. In a state of the art construction, individual battery cells are sandwiched between liquid-cooled heat exchanger panels, that is, inter-cell elements (ICE), having coolant circulation passages. The amount of heat removed from the cell is related to the flow rate of coolant through the plate. However, as the flow rate increases, the pressure drop also increases, thereby limiting the coolant flow rate and the cooling capacity of the panel.

Battery cooling fins (also known as inter-cellular element "ICE" plates) are generally made from very thin aluminum and have stamped channels through which coolant flows, for removing heat from the battery. As the structural integrity of the ICE plate is important, innovative techniques must be employed to ensure that the ICE plate channels do not collapse under the applied force of the batteries and of the manifold. Typically the channel dimensions are too thin to provide structural support from turbulizers inside the channels and therefore the channel dimensions are chosen such that they meet minimum load requirements.

In addition, at the entrance region of the channels a larger unsupported area exists so that coolant can be distributed to the various channels within the ICE plate. In some instances, such as the ICE plates with inlet/outlet tubes, radial seals can be used to secure a leak-free connection (see WO 2012/126111, incorporated herein by reference), however, in certain circumstances, for instance where matching up of the inlet and/or outlet of an ICE plate with a manifold is required without a tubular connection, and particularly in light of the extremely light gauge material of construction for the plates, a face seal can be more desirable. In addition, face seal can be generally easier to develop except special consideration needs to be applied to the structural integrity of the seal area.

In a face seal technique, a seal is pressed against a flat surface using a very high force. This flat surface must have enough structural integrity to prevent deflection of the sealing surface, otherwise a leak will form. Moreover, the plates should be able to withstand the clamping force and fitting load, when assembled. US 2006/0172177 A1 (incorporated herein by reference) discloses a method of face sealing by using under/over channels allowing for a flat sealing surface. However, it would be preferred to have the sealing surfaces align with each other through the plates to help reduce the likelihood of damage to the plates on sealing. Additionally, it is desirable to make the core plates symmetrical and to use the same seals for both the inlet and the outlet There is a need for an improved construction of heat exchanger, and particularly battery cell coolers for rechargeable batteries while improving manufacturability, which can allow for the sealing surfaces to align with each other through the plates; and which can provide better force transfer and can help to reduce the likelihood of damage to the plate on sealing. In addition, there is a need for an improved construction of heat exchanger, and particularly battery cell coolers for rechargeable batteries that can help to provide a better sealing method so that the ICE plates are not being forced out of plane during clamping or pressure cycling. Furthermore, there is a need for an improved construction of heat exchanger, and particularly a battery cell cooler that can provide improved flow control towards more uniform flow distribution.

SUMMARY

In one aspect, there is provided a heat exchanger having:
a plate pair defining a flow passage, the flow-passage in fluid communication with a fluid inlet and a fluid outlet for flow of fluid from the fluid inlet to the fluid outlet; and
a first structural support element sandwiched between the plate pair, the first structural support element having a first structural support element aperture and one or more channels extending from the first structural support element aperture to a peripheral edge of the structural support element, and wherein the structural support element is positioned circumferentially around the fluid inlet with the first structural support element aperture aligned with the fluid inlet, with the channels permitting flow of the fluid from the fluid inlet to the flow passage.

In an embodiment, each plate of the plate pair contains a peripheral edge in a first plane, and a lowered central plate portion in a second plane, the lowered central plate portion forming the flow passage and having the fluid inlet at a first end of the flow passage and the fluid outlet at a second end of the flow passage.

In another embodiment, the heat exchanger disclosed herein further contains ribs extending from the lowered central plate portion towards the first plane.

In another embodiment, in the heat exchanger disclosed herein, the structural support element is positioned in a depression at the first end of the flow passage.

In another embodiment, in the heat exchanger disclosed herein, a second structural support element is positioned in a depression at the second end of the flow passage and circumferentially around the fluid outlet, the second structural support element having a second structural support element aperture and second structural support element channels extending from the second structural support element aperture to a peripheral edge of the second structural support element, and wherein the second structural support element is positioned circumferentially around the fluid outlet with the second structural support element aperture aligned with the fluid outlet, and with the second structural support element channels permitting flow of the fluid from the flow passage to the fluid outlet.

In another embodiment, in the heat exchanger disclosed herein, the structural support element has a first face in contact with the depression on a first plate of the plate pair, and a second face in contact with the depression on a second plate of the plate pair.

In another embodiment, the heat exchanger disclosed herein further contains undulations extending from a plane of the structural support element, the undulations defining the channels for flow of the fluid from the fluid inlet to the flow passage and/or from the flow passage to the fluid outlet.

In another embodiment, in the heat exchanger disclosed herein, the structural support element contains a first channel having a first width and a second channel having a second width.

In another embodiment, in the heat exchanger disclosed herein, the first channel has a first length extending from a first edge of the structural support element defining the aperture to the peripheral edge of the structural support element, and the second channel has a second length extending from the first edge of the structural support element defining the aperture to the peripheral edge of the structural support element.

In another embodiment, in the heat exchanger disclosed herein, the structural support element is a circular sealing disc.

In another embodiment, in the heat exchanger disclosed herein, the structural support element is a longitudinal sealing disc.

In another, embodiment, the heat exchanger as disclosed herein is a battery cell cooler.

In another aspect, the specification relates to a heat exchanger having:

a pair of complementary plates defining a plurality of fluid flow channels, the fluid flow channels being in fluid communication with a manifold inlet channel at a first end of the plurality of fluid flow channels and a manifold outlet channel at a second end of the plurality of fluid flow channels; and a first longitudinal generally-U-shaped member positioned in the manifold inlet channel for providing structural support to the manifold inlet channel.

In one embodiment, the heat exchanger further contains a second longitudinal generally-U-shaped member positioned in the manifold outlet channel for providing structural support to the manifold outlet channel.

In another embodiment, in the heat exchanger noted above the first longitudinal generally-U-shaped member contains a base and walls extending from the base of the longitudinal generally-U-shaped member, and wherein the base contacts a first flat surface of the manifold inlet channel formed by one of the heat exchanger plates, and an edge of the walls distal from the base contacts a second flat surface of the manifold inlet channel formed by the other heat exchanger plates.

In another embodiment, in the heat exchanger noted above the second longitudinal generally-U-shaped member contains a base and walls extending from the base of the second longitudinal generally-U-shaped member, and wherein the base contacts a first flat surface of the manifold outlet channel formed by one of the heat exchanger plates, and an edge of the walls distal from the base contacts a second flat surface of the manifold outlet channel formed by the other heat exchanger plates.

In another embodiment, the heat exchanger noted-above further contains a lip extending from the walls of the longitudinal generally-U-shaped member.

In another embodiment, in the heat exchanger noted above, the lips extend outwardly and away from the walls.

In another embodiment, in the heat exchanger noted-above, the distance between the ends of the lips approximates the width of the manifold inlet and/or outlet channel.

In another embodiment, in the heat exchanger noted above, the longitudinal generally-U-shaped member further contains openings permitting flow of a fluid from the manifold inlet channel to the fluid flow channel, or flow of the fluid from the fluid flow channel to the manifold outlet channel.

BRIEF DESCRIPTION OF THE DRAWINGS

Reference will now be made, by way of example, to the accompanying drawings which show example embodiments of the present application, and in which:

FIG. 5b is a perspective view of a portion of the structural support element shown in FIG. 5a;

FIG. 6 is a plan view of a structural support element in accordance with a second embodiment positioned at the fluid inlet or outlet of the heat exchanger panel;

FIG. 11 discloses a cross-sectional view of a portion of the heat exchanger of FIG. 10;

FIG. 12 discloses a perspective view of a structural support element in accordance with another embodiment.

Similar reference numerals may have been used in different figures to denote similar components.

DESCRIPTION OF EXAMPLE EMBODIMENTS

Figure 1:
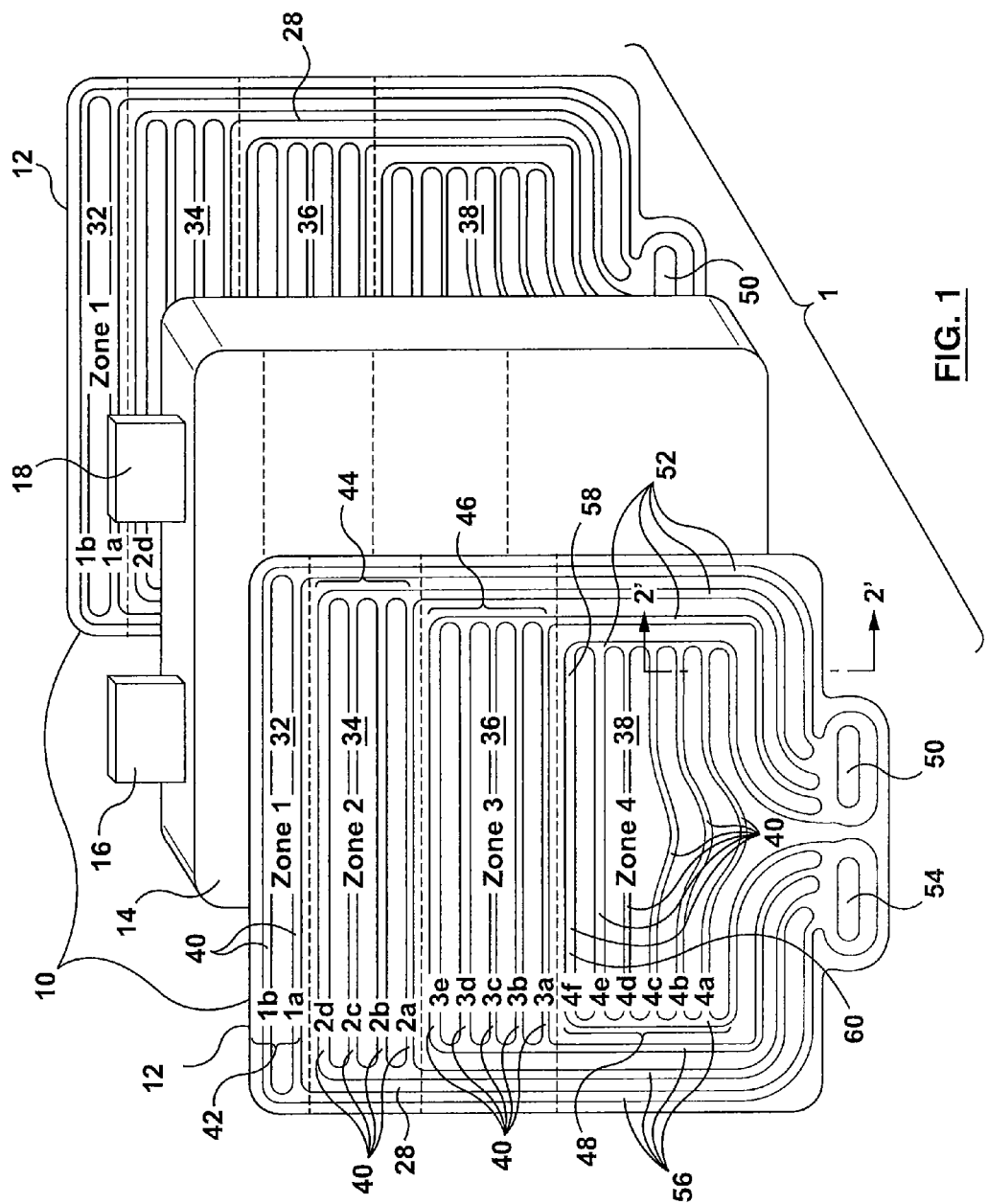
FIG. 1 is a perspective view showing a battery cell and a pair of heat exchanger panels of a battery module according to an embodiment.

FIG. 1 illustrates a heat exchanger 10 according to a first embodiment. The heat exchanger 10 contains a plurality of heat exchanger panels 12. Although only two panels 12 of heat exchanger 10 are shown in FIG. 1, it will be appreciated that the exchanger 10 can contain additional panels 12.

The heat exchanger panels 12 are arranged in spaced, parallel relation to one another, wherein the spacing between adjacent heat exchanger panels 12 is sufficient to receive a battery cell 14 in close thermal contact with the heat transfer surfaces of the adjacent panels 12. FIG. 1 illustrates a single battery cell 14 received between a pair of adjacent heat exchanger panels 12, however, it will be appreciated that the heat exchanger 10 may include additional battery cells 14 received between additional pairs of spaced apart panels 12. The combination of the battery cells 14 and the heat exchanger 10 is referred to herein as a battery module 1, in which the plurality of panels 12 comprising heat exchanger 10 are arranged in alternating order with the plurality of battery cells 14 making up the heat exchanger 10. This alternating arrangement of panels 12 and battery cells 14 in battery module 1 is shown in the partial cross-section of FIG. 2.

Each battery cell 14 has a single flat surface for contact with a heat transfer surface of a panel 12 or a pair of flat, opposed surfaces for contact with the heat transfer surfaces of panels 12, and a pair of tabs 16, 18 to provide an electrical connection with a bus bar (not shown), wherein the bus bar will be similarly connected to the tabs 16, 18 of the other cells 14 in the battery module 1. As shown in FIG. 1, the tabs 16, 18 will typically have a thickness which is less than that of the other portions of the battery cell 14.

Each heat exchanger panel 12 has a pair of opposed heat transfer surfaces 28, 30 which will be in close thermal contact with one of the flat surfaces of a battery cell 14, wherein heat is transferred from cell 14 to the coolant through the heat transfer surfaces 28, 30. In order to maximize heat transfer, the heat transfer surfaces 28, 30 of panels 12 are approximately the same size, shape and area as the flat surfaces of the battery cell 14 to be cooled.

As shown in FIG. 1, the heat exchanger panel 12 includes a plurality of fluid flow passages 40 to carry coolant across the surfaces 28, 30 of heat exchanger panel 12. As shown in the cross-section of FIG. 2, the fluid flow passages 40 are of substantially constant height, with the thickness of the heat exchanger panel 12 being defined by the height of the fluid flow passages 40. The fluid flow passages 40 may have flat tops and bottoms, as shown, for enhanced surface contact with battery cell 14, although the tops and bottoms of passages 40 may instead be rounded in some embodiments. The fluid flow passages 40 of heat exchanger panel 12 are shown as being relatively narrow, and do not require internal support structures in the form of dimples, ribs or turbulizers.

The heat exchanger panel 12 further comprises a fluid inlet opening 50 through which coolant enters the heat exchanger panel 12, and which is in flow communication with at least one fluid inlet passage 52, each of which is in the form of an elongate header communicating with a subgroup of fluid flow passages 40. Although, FIG. 1 discloses multiple fluid inlet passages 52, as should be appreciated by a person of ordinary skill in the art, depending upon the application and design requirements, it is also possible to have a single fluid inlet passage 52 in communication with one or multiple fluid flow passages 40.

Heat exchanger panel 12 further contains a fluid outlet 54 through which coolant is discharged from heat exchanger panel 12, and which is in fluid communication with at least one fluid outlet passage 56, each of which is in the form of an elongate header communicating with a subgroup of fluid flow passages 40. Further, analogous to the fluid inlet opening 50 and fluid inlet passages 52, although, FIG. 1 discloses multiple fluid outlet passages 56, as should be appreciated by a person of ordinary skill in the art, depending upon the application and design requirements, it is also possible to have a single fluid outlet passage 56 in communication with one or multiple fluid flow passages 40, and the single fluid outlet passage 56 is in fluid communication with the fluid outlet opening 54.

The fluid inlet openings 50 of heat exchanger panels 12 making up heat exchanger 10 will be connected to a coolant inlet manifold 138 and the fluid outlet openings 54 of heat exchanger panels 12 will be connected to a coolant outlet manifold 140 (FIG. 3), wherein the inlet and outlet manifolds are in flow communication with a coolant circulation system which may include a pump and a fan-cooled radiator or other heat exchanger to discharge heat from the coolant (not shown). The coolant inlet manifold 138 and the coolant outlet manifold can be provided as part of a frame 142 that is used to provide support to the battery cell 14 and the heat exchanger panels 12. Although, FIG. 3 only shows a single frame 142 structure, multiple frame structures 142 can be assembled together, along with the battery cells 14 and panels 12 to form the battery cell assembly with the heat exchanger.

Figure 3:
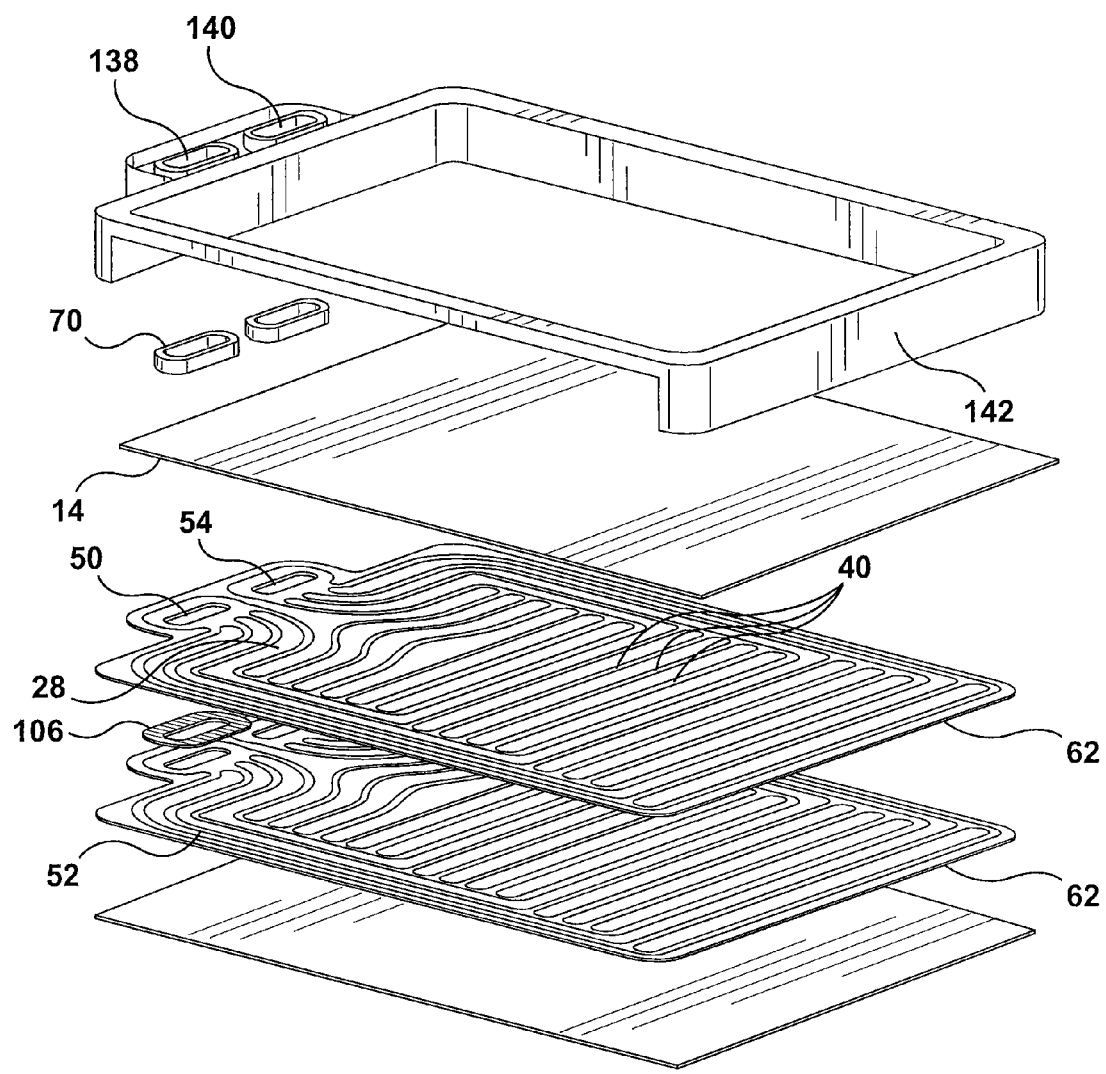
FIG. 3 is an exploded perspective view of a battery module.

As shown in FIG. 3, showing a module having a frame structure 142, a battery cell 14, a heat exchanger plates having a structural support element 106, a seal 70 is positioned between the coolant inlet manifold 138 in the frame 142 and the fluid inlet opening 50 in the panels 12. Similarly, a second seal 70 is positioned between the coolant outlet manifold 140 and the fluid outlet opening 54. The structural support element 106 in the panels 12 can help to enable the face seals 70 on the outside to withstand a high compressive force, when the fluid flows through the inlet manifold 138 into the inlet opening 50. The seals 70 disclosed are not particularly limited and in one embodiment, can be, for example and without limitation, a rubber seal. Therefore, in one embodiment, the specification relates to a heat exchanger module having a frame 142, a battery cell 14, heat exchanger panels 12 having the structural support element placed between the plates of the heat exchanger panels, as disclosed herein, and a seal positioned between the coolant inlet manifold 138 and the fluid inlet opening 50.

Figure 2:
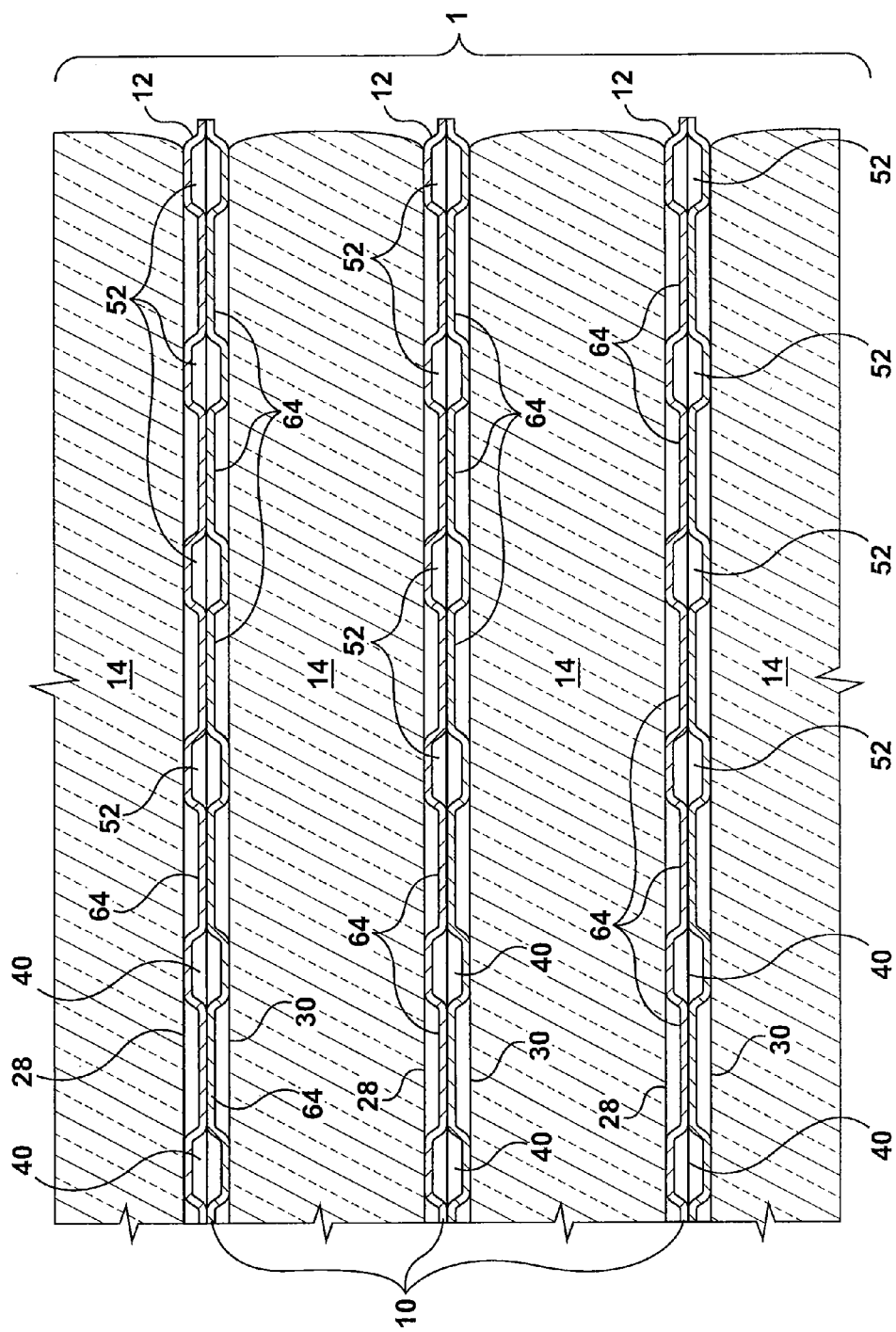
FIG. 2 is a cross section along line 2-2' of FIG. 1.

In the illustrated embodiment (FIG. 1), the heat exchanger panel 12 includes four fluid inlet passages 52, all of which are in flow communication with a single fluid inlet 50, and four fluid outlet passages 56, all of which are in flow communication with a common fluid outlet 54. The fluid inlet and outlet passages 52, 56 may have flat tops and bottoms, as shown in FIG. 2, for enhanced surface contact with the surfaces of battery cell 14, although the tops and bottoms of passages 40 may instead be rounded in some embodiments. The fluid inlet and outlet passages 52, 56 are shown as being relatively narrow, and do not require internal support structures in the form of dimples, ribs or turbulizers.

Each of the fluid flow passages 40 has a first end 58 through which it is connected to one of the fluid inlet passages 52, and a second end 60 through which it is connected to one of the fluid outlet passages 56. Therefore, coolant received through the fluid inlet opening 50 flows through the at least one fluid inlet passage 52 to the fluid flow passages 40, flows from the first ends 58 to the second ends 60 of the fluid flow passages 40 to the at least one fluid outlet passage 56, and then flows through the at least one fluid outlet passage 56 to the fluid outlet opening 54.

The heat exchanger panel 12 (also called a plate pair) may be formed from a pair of identical sheets 62, which are stamped with a pattern of raised areas and lowered areas which will form the fluid flow passages 40 and the fluid inlet and outlet passages 52, 56 when the sheets 62 are brought together in face-to-face contact. Stated another way, the raised areas, including the peripheral edge of the heat exchanger panel 12 lie in a first plane, while the lowered areas lie in a second plane. Typically, and as shown in the figures, it is the central sheet portion that has the lowered areas, which lie in a second plane. The peripheral edges and the raised areas of sheets 62 can be sealingly joined together, for example by brazing, so as to form flat areas 64 separating the fluid flow passages 40 and the inlet and outlet passages 52, 56, and extending along the outer peripheral edges of the heat exchanger panel 12. In the following description, the flat areas 64 between the fluid flow passages 40 are sometimes referred to as "ribs".

No coolant flows through the flat areas 64. The widths of the flat areas 64 may be minimized so as to maximize the area of heat exchanger panel 12 occupied by fluid flow passages 40, and the fluid inlet and outlet passages 52, 56. Also, although all the fluid flow passages 40 are shown in FIG. 2 as having the same width, it will be appreciated that they may be of different widths along at least a portion of their lengths.

Heat exchanger 10 includes a number of enhancements to minimize the pressure drop of a coolant flowing through the heat exchanger panels 12. Reducing pressure drop in the heat exchanger panels 12 enables the coolant to flow through the heat exchanger panels 12 at a higher flow rate, thereby increasing the amount of heat removed from the battery cells 14. The inventors have found that a heat exchanger panel 12 configured as shown in FIG. 1 has a pressure drop of 2.3 kPa at a flow rate of 60 ml/min. In contrast, a heat exchanger panel according to the prior art having a serpentine flow path has a pressure drop of 16 kPa at a flow rate of 60 ml/min.

It will be appreciated that widening the fluid flow passages 40 and/or the fluid inlet and outlet passages 52, 56 is another way to lower pressure drop, although this may require dimples and/or other structural features to provide support for the wider passages. The present embodiment allows passages 40, 52 and 56 to maintain a relatively narrow width, so as to avoid the need for structural supports within the channels, while maintaining low pressure drop. As would be appreciated by a person of ordinary skill in the art, numerous variations to the number and configurations of the passages 40, 52 and 56 are possible, while maintaining a low pressure drop.

Figure 4:
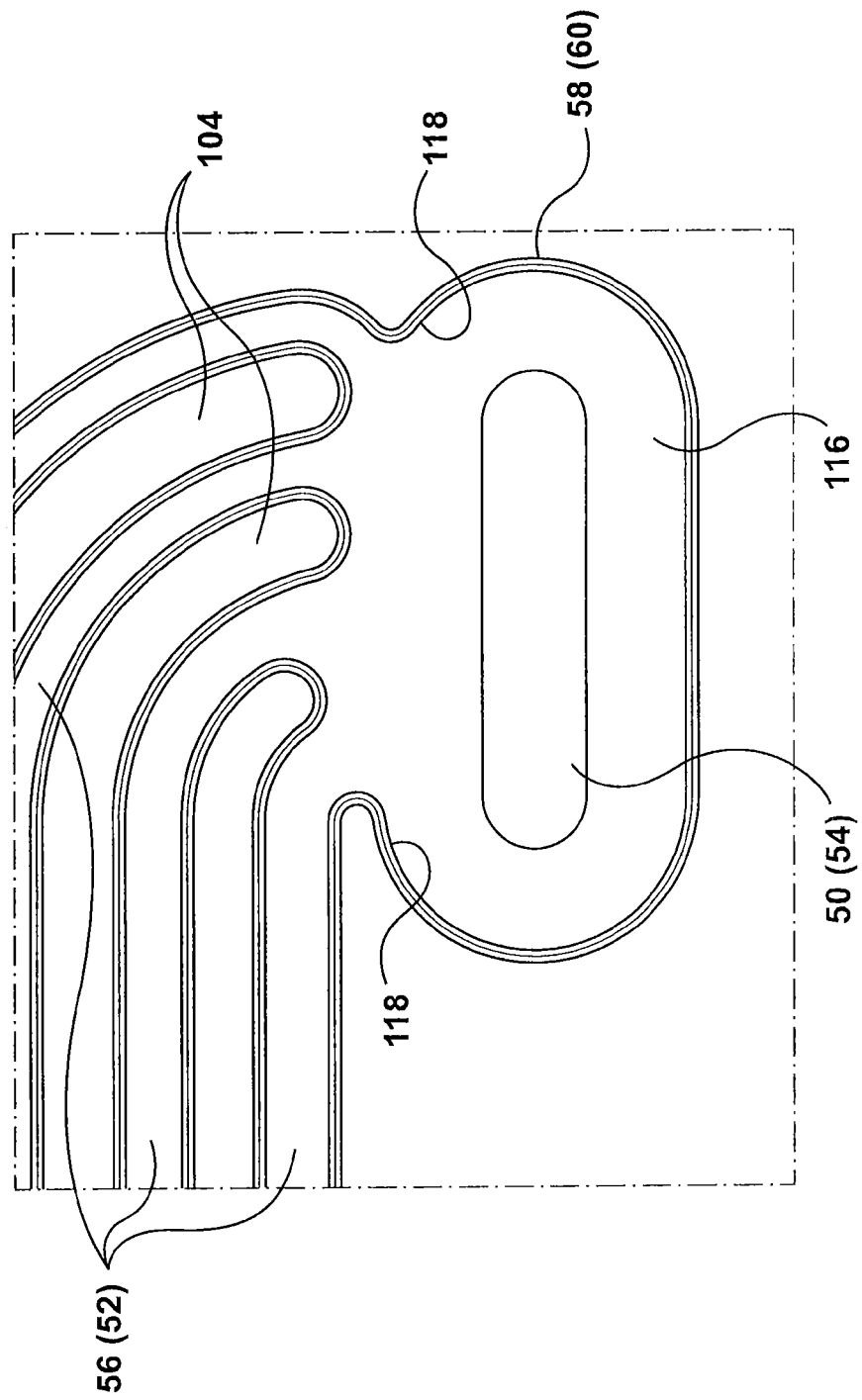
FIG. 4 is a plan sectional view of a fluid inlet or outlet of the heat exchanger panel without the structural support element.

FIG. 4 shows a section of the heat exchanger panel 12 having the fluid inlet 50 at a first end of the fluid inlet passage 52. The heat exchanger panel 12 also has the fluid outlet 54 at a second end of the fluid outlet passage 56, which can be similar in shape and structure to the fluid inlet 50 at a first end of the fluid inlet passage 52. As should be recognized by a person of ordinary skill in the art, the heat exchanger panels 12 can be made such that the fluid inlet 50 and fluid outlet 54 are in direct fluid communication with the fluid flow passage 40.

The first end of the fluid inlet passage 52 (or the second end of the fluid outlet passage 54) can be formed during the stamping process of the heat exchanger panel 12. Hence, the heat exchanger panel 12 has a depression 116 at the first fluid end of the fluid inlet passage 52 and the second end of the fluid outlet passage 56. In addition, depending upon the design and application requirements, both heat exchanger panels 12 of the plate pair are symmetrical and mirror images of each other, and have a depression 116 at the first end of the fluid inlet passage 52 and the second end of the fluid outlet passage 56. In other embodiments, it is also possible for the second panel of the plate pair to be a flat plate panel.

Figure 5A:
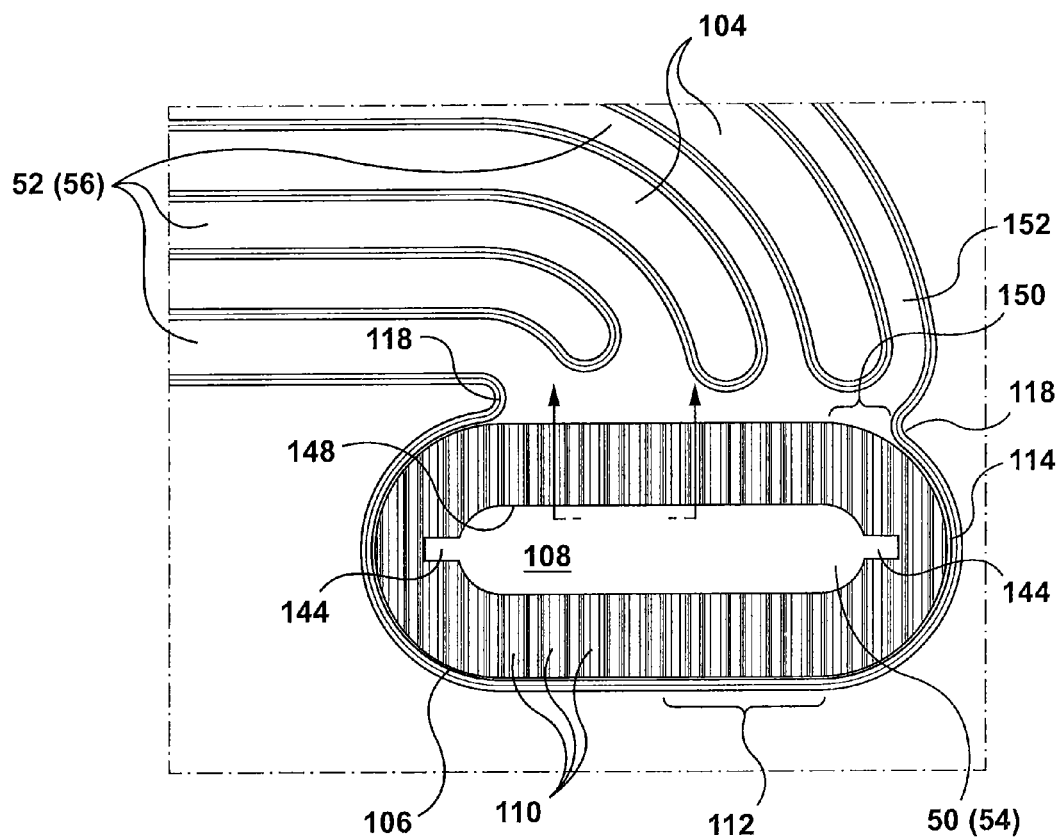
FIG. 5a is a plan view of a structural support element in accordance with an embodiment positioned at the fluid inlet or outlet of the heat exchanger panel.

FIG. 5a shows an embodiment of a structural support element 106 that can be used with the heat exchanger 10 disclosed herein. The structural support element 106 is positioned at the first end of the fluid inlet passage 52, and can also be present at the second end of the fluid end of the fluid outlet passage 56. In one embodiment, a structural support element 106 is positioned at the first end of the fluid inlet passage 52, and a second structural support element is present at the second end of the fluid end of the fluid outlet passage 52. To form the heat exchanger plate pair, two sheets or plates of the heat exchanger are placed in a face-to-face relationship with the structural support element 106 sandwiched between the heat exchanger plates to form each of the heat exchanger panels 12 (FIG. 3).

Figure 8:
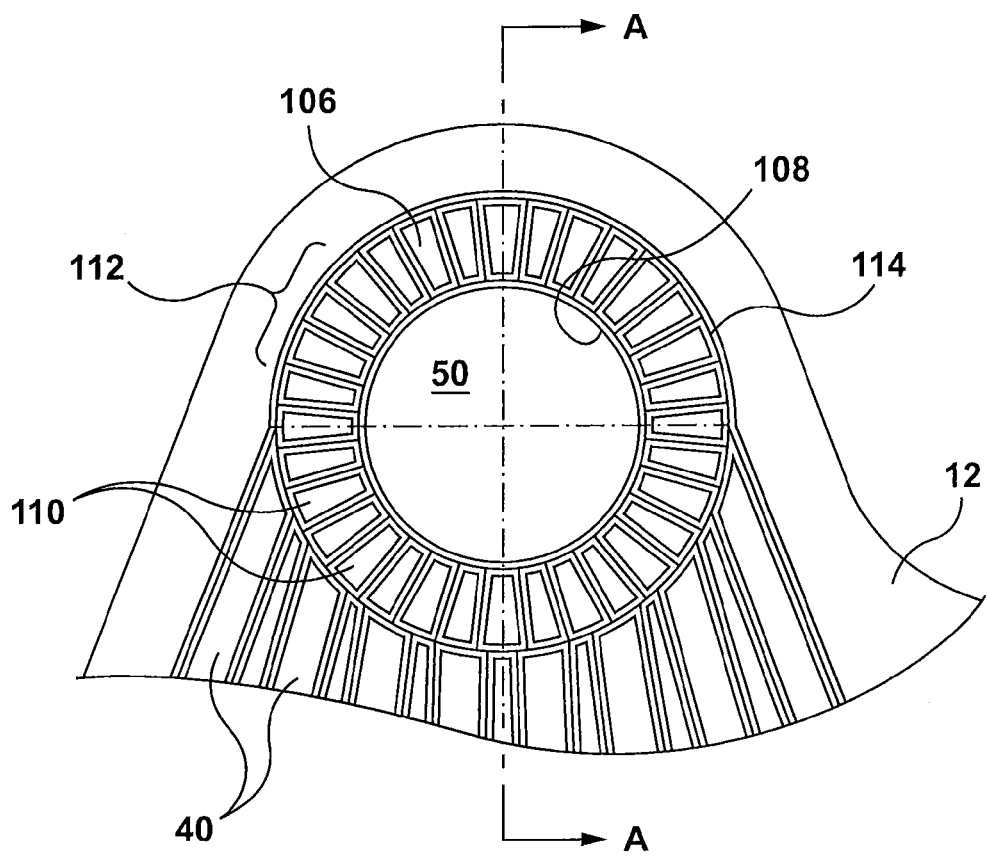
FIG. 8 is a plan view of a structural support element in accordance with a fourth embodiment positioned at the fluid inlet or outlet of the heat exchanger panel.

The shape of the structural support element 106 is not particularly limited and can be varied depending upon the design and application requirements. In one embodiment, as shown in FIG. 5a, the structural support element 106 can have an overall longitudinal structure. Alternatively, as shown in FIG. 8, the structural support element 106 can have an overall circular structure. The shape and structure of the structural support element 106 is designed to be complementary to the first end of the fluid inlet passage 52 (and the second end of the fluid outlet passage 56). This allows the peripheral edge of the structural support element 114 to be positioned within the depression 116 at the first end of the fluid inlet passage 52 (or the second end of the fluid outlet passage 56).

The heat exchanger panel 12 can be designed so that the first end of fluid inlet passage 52 and the second end of the fluid outlet passage 56 have a profile to retain the structural support element 106 in position. As shown in FIGS. 4 to 8, the heat exchanger panel 12 can be stamped so that the fluid flow passage 40 has one or more protrusions 118 narrowing the width of the fluid flow passage 40 near the first end of the fluid inlet passage 52 and the second end of the fluid outlet passage 56. When the structural support element 106 is positioned at the first end of the fluid inlet passage 52 and the second end of the fluid outlet passage 56, the peripheral edge of the structural support element 114 can come in contact with the wall extending from the depression 116 at the first and second end of the fluid flow passage. This, along with the protrusions 118 help to retain the structural support element 106 in position during manufacture of the heat exchanger plate pair.

Figure 5B:
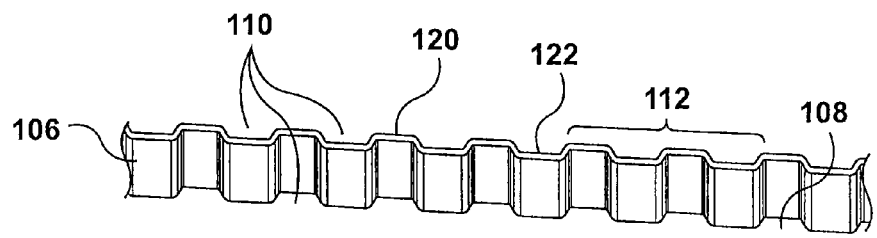

To allow the fluid to flow from the fluid inlet 50 to the fluid flow passage 40, or from the fluid flow passage 40 to the fluid outlet 54, the structural support element 106 is provided with a structural support element aperture 108 and one or more channels 110 as shown in FIGS. 5a and 5b. The structural support element aperture 108 can be created by punching out a hole in the structural support element 106, or other means, as should be known by a person of ordinary skill in the art. The position of the structural support element aperture 108 is not particularly limited, so long as it can align with the fluid inlet 50 (or fluid outlet 54) and allow for fluid to flow from the fluid manifold into the fluid inlet 50 (or fluid outlet 54) and then into the channels 110, and from there into the fluid flow passage 40 of the heat exchanger panel 12. In the embodiment shown in FIGS. 4-8, the edge of the structural support element 106 defining the structural support element aperture 108 aligns with the edge of the first end of the fluid flow passage 58 (or second end of the fluid flow passage 60) that defines the fluid inlet 50 (or fluid outlet 54).

In the embodiment shown in FIGS. 5a and 5b, the channels 110 are created by having undulations 112 formed on the structural support element 106. The undulations 112 extend from a plane having the structural support element 106, which result in formation of crests 120 and troughs 122 in the structural support element 106. The presence of the crests 120 and troughs 122 leads to formation of channels 110, which allow the fluid to flow from the fluid inlet 50 to the fluid flow passage 40, or from the fluid flow passage 40 to the fluid outlet 54. In addition, presence of crests 120 and troughs 122 can help to provide support to the heat exchanger panels 12 at the first and second ends fluid flow passage 52, 56 where the fluid inlet and outlet 50, 54, respectively, are present.

The channels 110 of the structural support element 106 can be varied depending upon the application and design requirements. For instance, FIG. 6 shows a structural support element 106 having at least two distinct set of channels that vary in width. Hence, the structural support element 106 is provided with a first set of channels 124 having a first width and a second set of channels 126 having a second width. In the embodiment shown in FIG. 6, the first set of channels 124 are wider (in other words, have a greater pitch) than the second set of channels 126. Although only two sets of channels are shown, as should be recognized by a person of ordinary skill in the art, additional sets of channels, such as 3, 4, 5, 6 or more, having varying pitch (or width) can be provided.

Depending upon the design of the structural support element 106, such as shown in FIG. 6, the graded channel width can help promote flow of the fluid to one side of the heat exchanger plate pair, as channels having greater pitch can allow more fluid to flow in. For instance, for the structural support element 106 shown in FIG. 6, more fluid will flow into the first set of channels 124 than the second set of channels 126, permitting greater fluid flow towards areas of the heat exchanger plate pair that lies close to the first set of channels 124.

Figure 7:
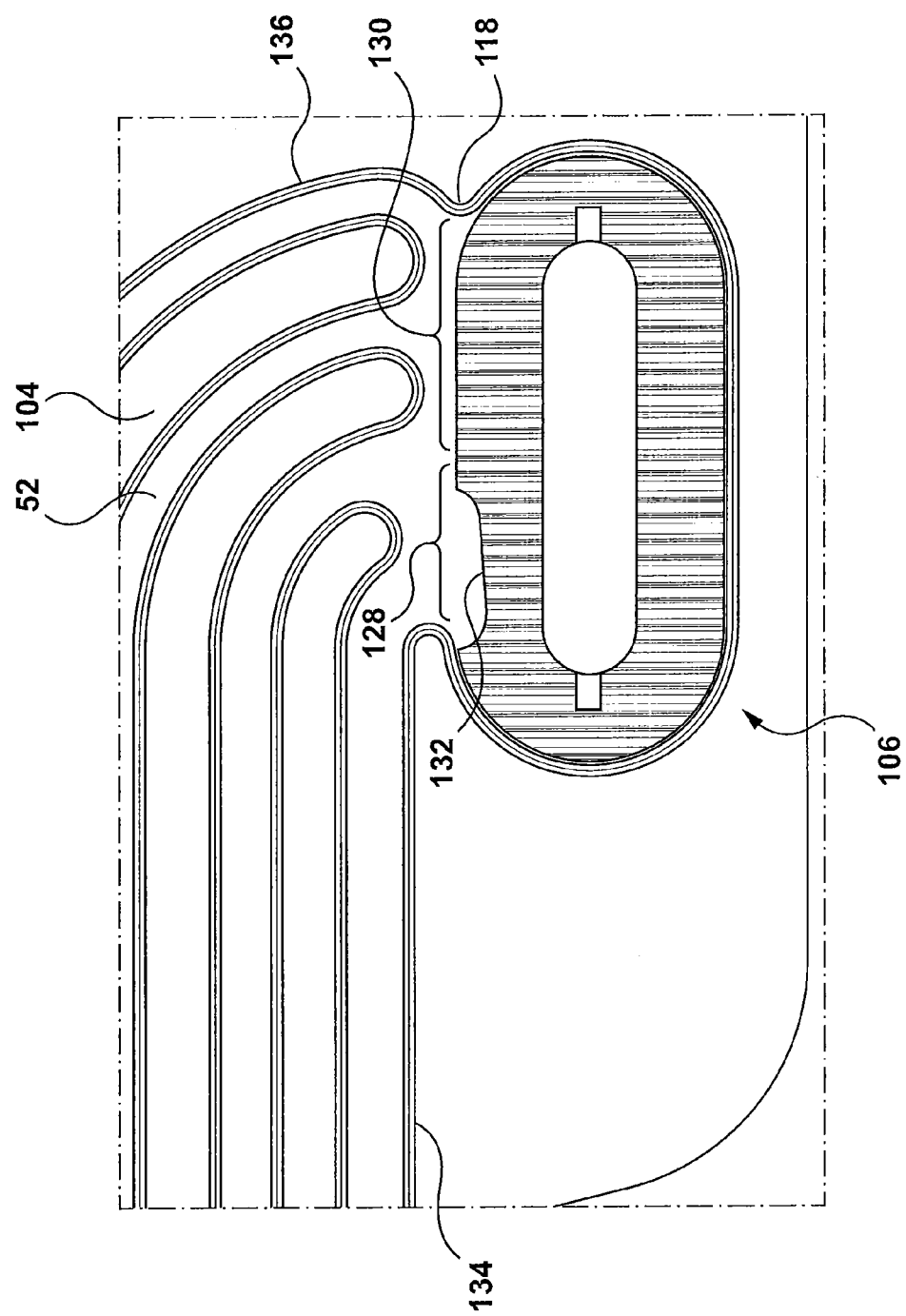
FIG. 7 is a plan view of a structural support element in accordance with a third embodiment positioned at the fluid inlet or outlet of the heat exchanger panel.

FIG. 7 shows a further embodiment of a structural support element 106 that can be used in the heat exchanger 10 disclosed herein. In the embodiment shown in FIG. 7, the structural support element 106 has at least two distinct set of channels that vary in length. The structural support element 106 is provided with a first set of channels 128 having a first length and a second set of channels 130 having a second length. In the embodiment shown in FIG. 7, the first set of channels 128 is shorter in length than the second set of channels 130. Although only two sets of channels are shown, as should be recognized by a person of ordinary skill in the art, additional sets of channels, such as 3, 4, 5, 6 or more, having varying length can be provided.

Similar to the embodiment shown in FIG. 6, depending upon the design of the structural support element 106, such as shown in FIG. 7, the shorter path length channels can help promote flow of the fluid to high flow regions of the heat exchanger plate pair. The shorter set of channels, such as first set of channels 126, can be manufactured by forming a cut-out 132 at the peripheral edge 114 of the structural support element 106. The position of the cut-out 132 is made so that the length of the channels 110 opening toward the fluid flow passage 40 is varied. Further, although FIG. 7 discloses the cut-out towards the inner edge 134 of the fluid flow passage 40, the cut-out can be positioned centrally or towards the outer edge 136 of the fluid flow passage 40.

In general, as shown in FIGS. 6 and 7, the channels 110 of the structural support element 106 that can be used for control of flow of the fluid will be positioned according to the structure of the heat exchanger panel 12. As shown in FIGS. 6 and 7, the fluid inlet passage 52 can vary in width to allow greater flow of fluid towards a particular portion of the heat exchanger panel, which can depend upon the design and application requirements. For instance, in FIG. 6, the fluid inlet passages 52 that are aligned with the first set of channels 124 are wider than the fluid passages 52 that are aligned with the second set of channels 126. Similarly, in FIG. 7, the first set of channels 128 that are aligned with fluid inlet passages 52 are shorter in length than the second set of channels 130 to allow for greater fluid flow; as the fluid inlet passage 52 aligned with the first set of channels 128 are wider than the fluid inlet passages 52 that are aligned with the second set of channels 130.

In an embodiment, as shown in FIGS. 5a, 6 and 7, the structural support element 106 can be provided with a cavity 144 to allow for fluid to flow in channels 150 of the structural support element 106, and from there into the fluid inlet passage 52. In the embodiments shown, the cavity 144 is formed from an edge 148 of the structural support element 106 that defines the aperture 108 towards the peripheral edge 114 of the structural support element 106.

When the cavity 144 is absent, fluid flows from the structural support element aperture 108 to the channels 110 and from there into the fluid inlet passage 52. However, some channels 150 would not have fluid flowing in them and hence, there would be reduced flow of fluid into a fluid inlet passage 152 that is positioned close to a peripheral edge of the heat exchanger panel 12. In order to increase fluid flow towards the fluid inlet passage 152 that are positioned close to a peripheral edge of the heat exchanger panel 12, the structural support element 106 can be provided with a cavity 144. This allows fluid entering from the structural support element aperture 108 to flow into the cavity 144, and from there into channels 150 that are aligned with the fluid inlet passages 152, thereby increasing fluid flow towards the peripheral edge of the heat exchanger panel 12.

Figure 9A:
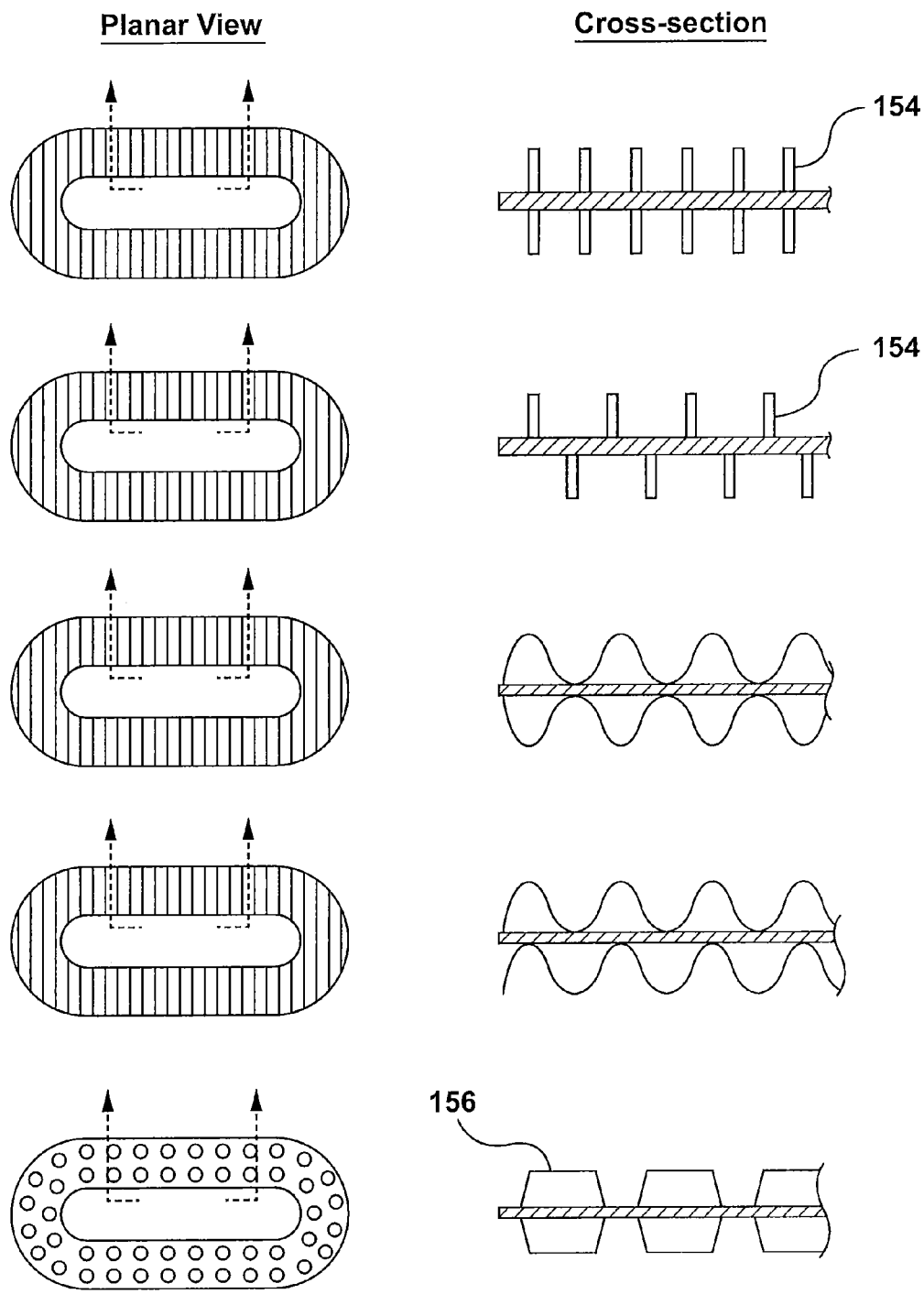
FIG. 9(a) shows other embodiments of structural support elements in accordance with the description.
Figure 9B:
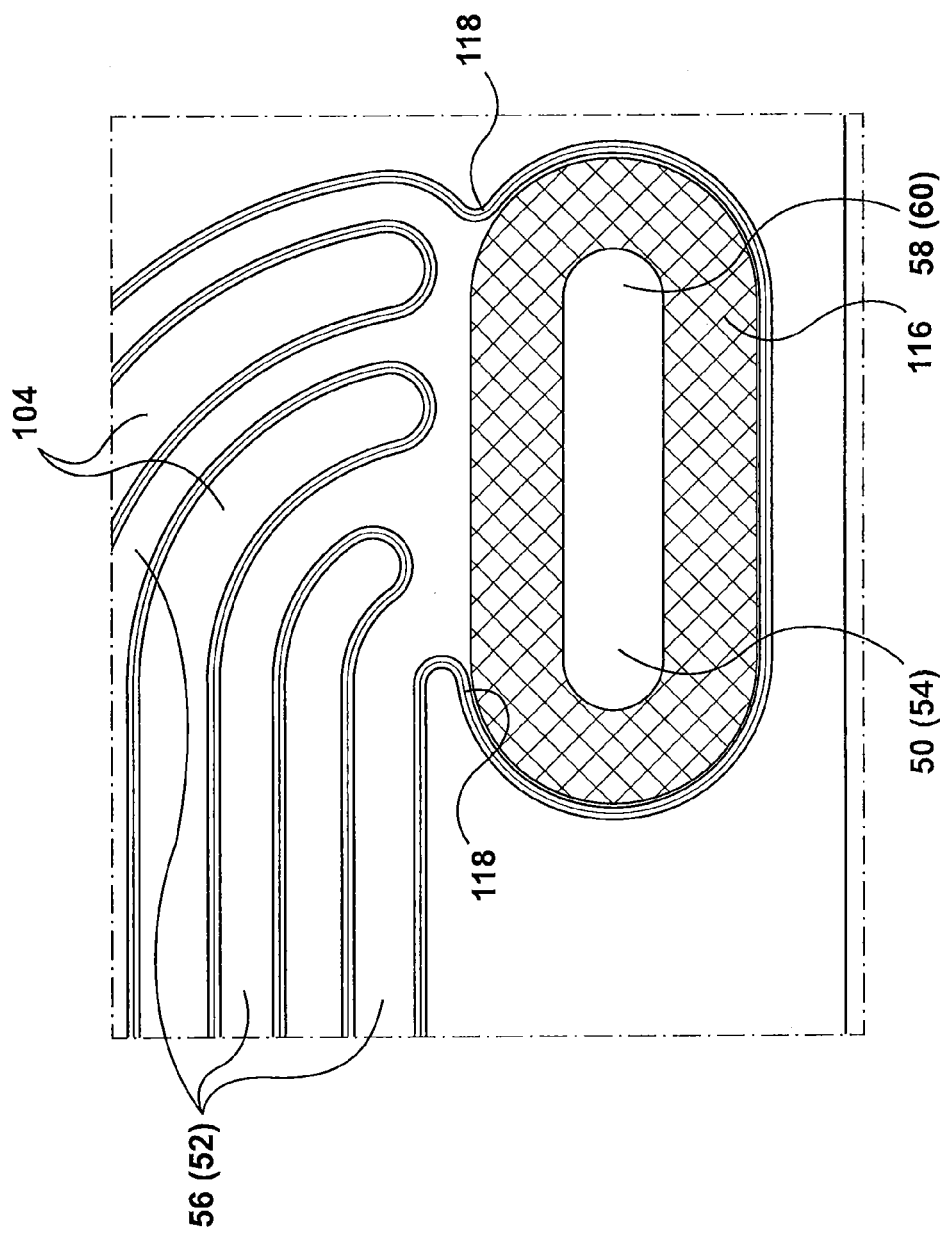
FIG. 9(b) shows another embodiment of a structural support element in accordance with the description.

FIGS. 9(a) & (b) shows alternate embodiments of structural support elements 106 that can be used in the heat exchanger panels 12 disclosed herein. In the first two embodiments shown in FIG. 9(a), the channels 110 are formed by teeth 154 extending from the structural support element 106, where as shown in the first embodiment in FIG. 9(a), the teeth 154 can be aligned or off-set, as shown in the second embodiment. The third and fourth discs shown in FIG. 9(a) show embodiments where channels 110 are formed from undulations similar to those shown in FIGS. 5-7, however, the structural support element 106 in such an embodiment has three layers with the top and bottom layers being undulated. The fifth embodiment of FIG. 9(a) shows a further embodiment of a structural support element 106 having dimples 156 on the surface of the structural support element 106. The dimples 156 can be arranged to form the channels 110 for guiding fluid flow. The structural support elements disclosed herein can help to provide structural support to the inlet and outlet portion of the heat exchanger, while permitting face sealing of the heat exchanger plates. FIG. 9(b) shows another embodiment of a structural support element 106 formed of a foam material. In the embodiment shown in FIG. 9(b), the channels result from the material being porous to allow for fluid to flow through from the aperture 108 to the fluid inlet passage 52. The porosity of the foam used is not particularly limited and can vary based on design and application requirements. Further, increasing the porosity of the foam can result in a decrease in pressure drop of the fluid, and vice versa, thus allowing adjustment for flow control into the heat exchanger.

Figure 10:
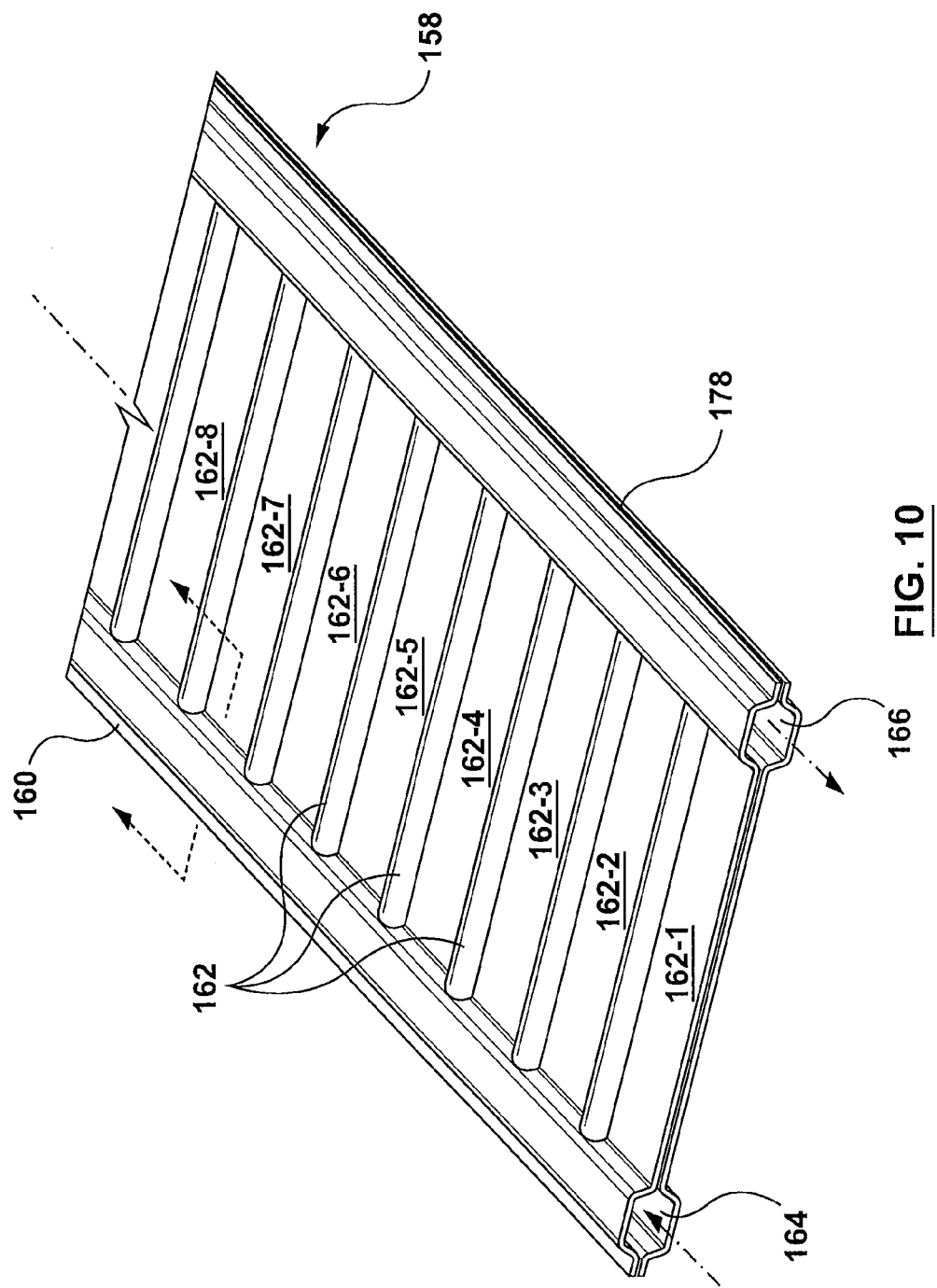
FIG. 10 discloses a perspective view of a heat exchanger in accordance with another embodiment.
Figure 13:
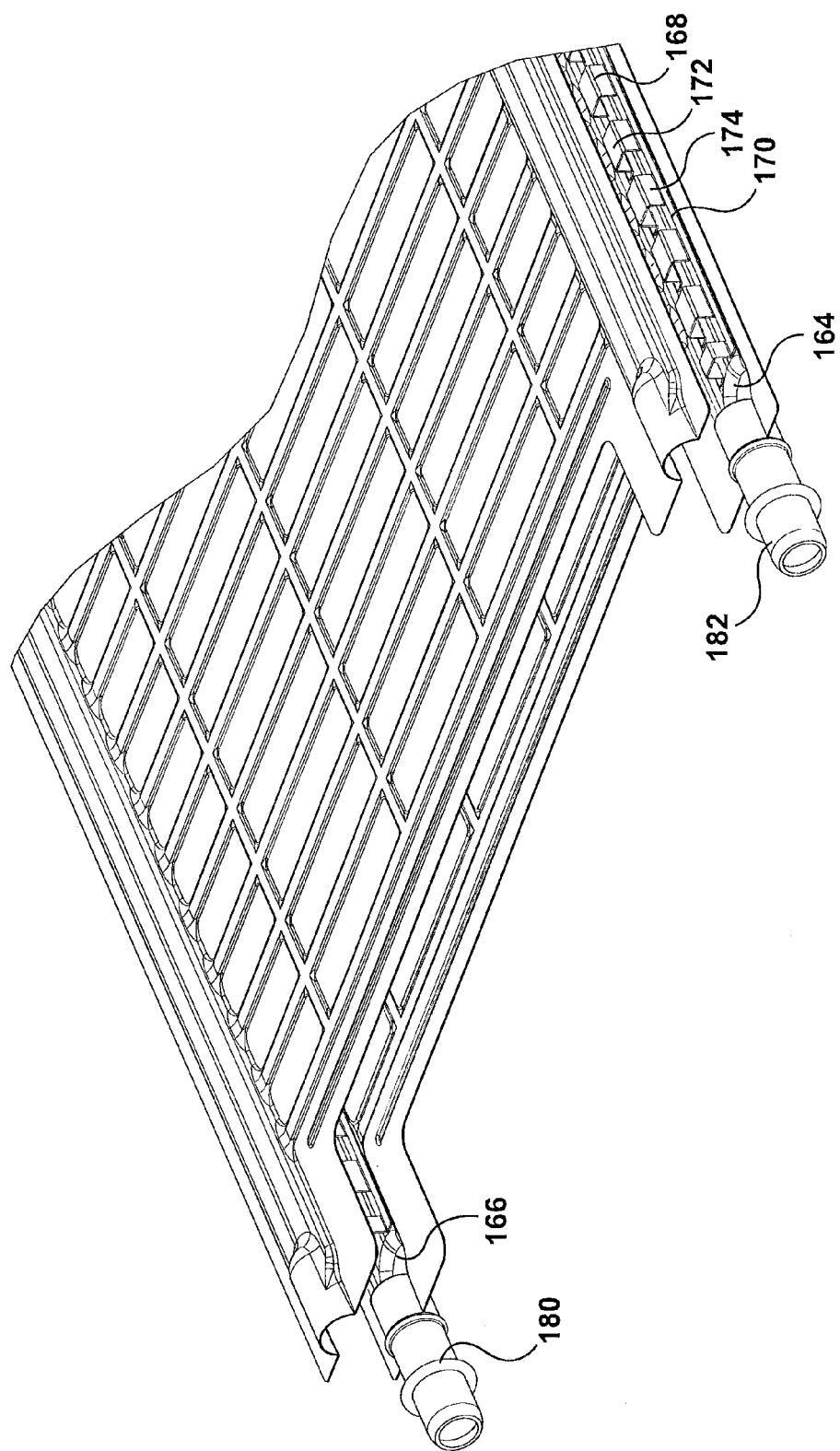
FIG. 13 discloses a perspective view of a heat exchanger in accordance with another further embodiment.

FIG. 10 discloses another embodiment of a heat exchanger that encompasses a structural element in the inlet and/or outlet manifold and that can help to provide radial sealing (180, as shown in FIG. 13). In the embodiment shown in FIG. 10, the structural element is provided in the fluid inlet manifold 164 and/or the fluid outlet manifold 166, where the fluid enters. Analogous to the depression area 116 of the heat exchanger shown in FIGS. 4-8, in the heat exchanger shown in FIG. 10, as the fluid flows in the fluid inlet and/or outlet manifold, the fluid inlet manifold 164 and/or the fluid outlet manifold 166 can be quite susceptible to deformation. The structural support element in the inlet manifold and/or outlet manifold can help to avoid deformation. Further, a tube 182 can be connected to the inlet and/or outlet of the heat exchanger, and where the tube(s) 182 can be provided with a radial seal to prevent leaks when the tube is coupled to the heat exchanger inlet and/or outlet.

The heat exchanger shown in FIG. 10 is a cold-plate type heat exchanger 158 that is composed of a pair of heat exchanger plates 160. Cold-plate type heat exchangers 158 are generally placed underneath a battery module. Each of the heat exchanger plates 160 are stamped to form channels in each of the heat exchanger plates 160. The stamping of heat exchanger plates 160 is performed on a central portion of the heat exchanger plates 160. The result of stamping is that the peripheral edges 178 of the heat exchanger plates 160 lies in a different plane than the top and bottom of the manifold 164/166 and the top and bottom of the horizontal channels 162, which can be in a different plane. Further, the top and bottom of the horizontal channels 162 can be in the same or different plane than the top and bottom of the manifold 164/166.

When each of the heat exchanger plates 160 are placed in a face-to-face relationship, the heat exchanger plate pair forms fluid flow channels 162 that has a manifold inlet channel 164 on one end 180 of the fluid flow channels 162, and a manifold outlet channel 166 at a second end 182 of the fluid flow channels 162. In the embodiment shown in FIG. 10, a plurality of fluid flow channels 162 are provided, such as 162-1, 162-2, 162-3, 162-4 and so on, where each of the fluid flow channels 162 is parallel to the next. However, as would be recognized by a person of ordinary skill in the art, the fluid flow channels 162 do not necessarily need to be parallel to each other, and can vary depending upon the design and application requirements.

In addition, the width of the fluid flow channels 162 can be varied depending upon the design and application requirements. Generally, the manifold inlet channel 164 and the manifold outlet channel 166 are wider than the width of the fluid flow channels 162. During operation, fluid in the manifold inlet channel 164 flows into the fluid flow channel 162 at the first end 180 and then exits into the manifold outlet channel 166 at the second end 182 of the fluid flow channel 162.

When the heat exchanger 158 is in use, fluid flowing in the heat exchanger plates 160 preferentially flows into the initial fluid flow channels, such as 162-1 and 162-2, over the latter fluid flow channels, such as 162-5 and 162-6. As each plate 160 of the heat exchanger 158 is quite thin, the manifold inlet channel 164 and the manifold outlet channel 166 can experience significant pressure and are susceptible to deformation while in use, which can significantly impact the performance of the heat exchanger 158.

To address the above challenge, each of the manifold inlet channel 164 and the manifold outlet channel 166 can be provided with a longitudinal U-shaped member 168 (FIGS. 11, 12 and 13). The U-shape member can act as a structural support element and can help to provide structural support and improve the integrity of the manifold inlet channel 164 and the manifold outlet channel 166, thereby helping to prevent their deformation. The length of the U-shaped member 168 is not particularly limited and in the embodiment shown in FIGS. 11 and 12, each of the U-shaped members 168 can extend nearly the entire length of the manifold inlet channel 164 and the manifold outlet channel 166. Alternatively, in the embodiment shown in FIG. 13, cutouts can be formed along the length of the U-shaped member 168 to provide a plurality of spaced apart U-shaped member sections 168, which can be in the manifold inlet channel 164 and/or the manifold outlet channel 166.

Further, the shape of the structural support element is generally U-shaped, i.e., the structural support element is provided with a base 172 and a pair of walls 174 extending from the base 172 to form the generally U-shaped member. As shown in FIG. 11, the base 172 is flat and can come in contact with the flat surface of the manifold inlet channel 164 or the manifold outlet channel 166. However, depending upon the design and application requirements, the base 172 can also be arched.

The distance between the walls 174 of the generally U-shaped member 168 is not particularly limited and can depend upon the design and application requirements. The walls 174 of the U-shaped member 168 can be brought closer to each other, so long as they can provide structural support to the manifold inlet channel 164 or the manifold outlet channel 166. Alternatively, the walls 174 can be so positioned that the distance between the walls 174 nearly approximates the width of the manifold inlet channel 164 and the manifold outlet channel 166. In the embodiment shown in FIG. 11, the walls 174 of the U-shaped member 168 are kept apart sufficiently to separate the manifold inlet channel 164 or the manifold outlet channel 166 into three sub-channels V1, V2 and V3 that have nearly equal width, so as to provide sufficient support to the manifold inlet channel 164 and the manifold outlet channel 166. In a particular embodiment, the walls 174 of the U-shaped member 168 are positioned such that the width of sub-channel $V_2$ is greater than $V_1$ or $V_3$. In a still further particular embodiment, a sheet, to further provide structural support, is positioned between the lips 170 of the U-shaped member 174 and the flat surface of the manifold. In such an embodiment, the structural support element is formed by the combination of the U-shaped member 174 and the sheet, both positioned in the manifold. Such an embodiment, having walls 174 of the U-shaped member 168 that provide a large sub-channel $V_2$ and the sheet can be used in higher pressure applications.

In the embodiment shown in FIGS. 11 and 12, the U-shaped member 168 is provided with a lip 170 extending from an edge of each wall 174. As shown, the base 172 is positioned at one end of the wall 174, while a lip 170 extends from an opposite end of the wall 174. The lips 170 are generally flat and lie in a plane that is parallel to the plane of the base 172 of the U-shaped member 168. Further, like the base 172, the lips 170 contact the flat surface of the manifold inlet channel 164 or the manifold outlet channel 166. However, while the base 172 contacts the flat surface of the manifold inlet channel 164 or the manifold outlet channel 166 of one plate of the heat exchanger plate pair 160, the lips 170 contact the flat surface of the manifold inlet channel 164 or the manifold outlet channel 166 of second plate of the heat exchanger plate pair 160, which is in face-to-face contact with the first plate.

Further, as shown in FIGS. 11, 12 and 13, each lip 170 of the U-shaped member 168 extends outwardly and away from the walls 174 of the U-shaped member 168. The length of the lip is not particularly limited, and can vary depending upon the design and application requirements. In the embodiment shown in FIGS. 11 and 12, the lips 170 extend from the wall 174 of the U-shaped member 168 to nearly the entire width of the manifold inlet channel 164 and/or the manifold outlet channel 166. Further to the above, in an alternate embodiment, as shown in FIG. 13, the lips 170 extends along the entire length of the manifold inlet channel 164 and/or the manifold outlet channel 166, with sections of the U-shaped member 168 being cutout.

During assembly of the heat exchanger 158, the heat exchanger plates 160 are placed in a face-to-face relationship; with the U-shaped member 168 sandwiched between the plate pairs and positioned in the manifold inlet channel 164 and/or the manifold outlet channel 166. The entire assembly can be sealed by brazing or other means, as should be known to a person of ordinary skill in the art.

FIG. 12 shows that the walls 174 of the U-shaped member 168 are provided with openings 176. During operation, fluid flowing in the manifold inlet channel 164 in the sub-channels, such as V1 and V2, can flow through the openings 176 into sub-cannel V3 and then into the fluid flow channels 162. In addition, the size of the openings 176, the number of the openings 176 and the distance between openings 176 is not particularly limited and can vary depending upon design and application requirements. In addition, control of these aspects can help to control and direct fluid flow towards or away from a fluid flow channel 162.

For instance, as noted above, fluid flowing in the manifold inlet channel 164 preferentially flows into the earlier fluid flow channels, such as 162-1 and 162-2, rather than fluid flow channels that are further downstream, such as 162-6 and 162-7. By reducing the size of the openings 176 that align with the earlier channels, such as 162-1 and 162-2, or increasing the size of openings that align with downstream channels, such as 162-10 and 162-12, fluid can be directed to downstream fluid flow channels 162 over the upstream fluid flow channels 162 of the heat exchanger 158.

Similarly, fluid flow can be controlled by increasing or decreasing the number of openings 176 that align with the fluid flow channels 162. For instance, increasing the number of openings 176 downstream on the U-shaped member 168, or reducing the number of openings 176 upstream on the U-shaped member 168, fluid can be directed towards downstream channels, such as 162-10 and 162-12, over upstream channels, such as 162-1 and 162-2.

FIG. 12 shows an embodiment of a U-shaped member 168 where the distance between the openings 176 is used to control fluid flow. As noted above, the U-shaped member 168 is provided with openings, 176-1, 176-2 and 176-3. To control or direct fluid flow preferentially to a particular set of fluid flow channels over another set, the distance between the openings, 176-1, 176-2 and 176-3 can be varied. Hence, openings 176-1 and 176-2 are separated by a distance $d_1$, while openings 176-2 and 176-3 are separated by a distance $d_2$. If distance $d_2$ is less than $d_1$, fluid quantity flowing into a fluid flow channel that aligns with opening 176-2 and 176-3 will be larger than fluid flow channel that aligns with opening 176-1. Hence, by controlling the distance between the openings 176, the general tendency of fluid flow towards upstream fluid flow channels 162 can be mitigated.

In an alternate embodiment as shown in FIG. 13, the spacing between the plurality of U-shaped members 168 can help to control fluid flow from the manifold inlet channel 164 to the fluid flow channels 162. Similar to the openings in the embodiment shown in FIG. 12, the greater the spacing between two adjacent U-shaped member sections 168, in the embodiment shown in FIG. 13, the greater the volume of coolant that can flow from the manifold inlet channel 164 to the fluid flow channels 162.

The embodiments shown in FIGS. 10-13 allow for radial sealing of the heat exchanger plate pairs. In contrast, the embodiments shown in FIGS. 1-9 allow for facial sealing of the heat exchanger plates.

The material of construction used for making the heat exchanger and the face-sealing/structural element, such as the structural support element or the U-shaped member, is not particularly limited. For example and without limitation, the heat exchanger plates, particularly the ICE plates, can be made of aluminum having a thickness of about 0.008 inch. However, as should be recognized by a person of skill in the art, other materials and thickness can be used depending upon design and application requirements. Similarly, the structural support element can be made of, for example and without limitation, aluminum, such as 3004 Al-alloy, and having a thickness of about 0.012 inch. However, as should be recognized by a person of skill in the art, other materials and thickness can be used depending upon design and application requirements. For example and without limitation, the structural support element can be made of a stainless steel material having an elastomeric coating applied on it.

Certain adaptations and modifications of the described embodiments can be made. Therefore, the above discussed embodiments are considered to be illustrative and not restrictive.

| PART'S LIST | |
|---|---|
| 1 Battery module | 154 teeth |
| 10 heat exchanger (HX) | 156 dimples |
| 12 heat exchanger panel | 158 Cold-type heat exchanger |
| 14 battery cell | 160 heat exchanger plates |
| 16 tab | 162 fluid flow channels |
| 18 tab | 164 manifold inlet channel |
| 28 heat transfer surface of panel | 166 manifold outlet channel |
| 30 heat transfer surface of panel | 168 U-shaped member |
| 40 fluid flow passage | 170 lip extending from U-shaped member |
| 50 fluid inlet opening | |
| 52 fluid inlet passage | 172 base of U-shaped member |
| 54 fluid outlet opening | 174 walls of U-shaped member |
| 56 fluid outlet passage | 176 openings |
| 58 first end of fluid flow passage | 178 peripheral edge of heat exchanger plates |
| 60 second end of fluid flow passage | |
| 62 sheet of HX panel | 180 radial seal |
| 64 flat areas (ribs) | 182 tube |
| 104 ribs | |
| 106 structural support element | |
| 108 structural support element aperture | |
| 110 channel | |
| 112 undulations | |
| 114 peripheral edge of disc | |
| 116 depression at $1^{st}/2^{nd}$ end of fluid flow passage | |
| 118 protrusion | |
| 120 crest | |
| 122 trough | |
| 124 $1^{st}$ set of channels of $1^{st}$ width | |
| 126 $2^{nd}$ set of channels of $2^{nd}$ width | |
| 128 $1^{st}$ set of channels of $1^{st}$ length | |
| 130 $2^{nd}$ set of channels of $2^{nd}$ length | |
| 132 cut-out | |
| 134 inner edge of fluid flow passage | |
| 136 outer edge of fluid flow passage | |
| 138 coolant inlet manifold | |
| 140 coolant outlet manifold | |
| 142 frame | |
| 144 cavity | |
| 148 edge of structural support element defining aperture | |
| 150 channels aligned with cavity | |
| 152 fluid inlet passage receiving fluid from cavity | |

What is claimed is:

1. A heat exchanger comprising:
a plate pair defining a flow passage, the flow passage fluidly coupled to a fluid inlet at a first end and a fluid outlet at a second end for flow of fluid from the fluid inlet to the fluid outlet; and
a structural support element sandwiched between the plate pair, the structural support element having a first structural support element aperture and one or more channels extending from the first structural support element aperture to a peripheral edge of the structural support element, and wherein the structural support element is positioned circumferentially around the fluid inlet with the first structural support element aperture aligned with the fluid inlet, with the channels permitting flow of the fluid from the fluid inlet to the flow passage.

2. The heat exchanger according to claim 1, wherein each plate of the plate pair comprises a peripheral edge in a first plane, and a depression in a second plane, the depression forming the flow passage and having the fluid inlet at the first end of the flow passage and the fluid outlet at the second end of the flow passage.

3. The heat exchanger according to claim 2, further comprising ribs extending from the depression towards the first plane.

4. The heat exchanger according to claim 1, wherein the structural support element is positioned in the depression at the first end of the flow passage.

5. The heat exchanger according to claim 1, wherein a second structural support element is positioned in the depression at the second end of the flow passage and circumferentially around the fluid outlet, the second structural support element having a second structural support element aperture and second structural support element channels extending from the second structural support element aperture to a peripheral edge of the second structural support element, and wherein the second structural support element is positioned circumferentially around the fluid outlet with the second structural support element aperture aligned with the fluid outlet, and with the second structural support element channels permitting flow of the fluid from the flow passage to the fluid outlet.

6. The heat exchanger according to claim 1, wherein the structural support element comprises a first face in contact with the depression on a first plate of the plate pair, and a second face in contact with the depression on a second plate of the plate pair.

7. The heat exchanger according to claim 1, further comprising undulations extending from a plane of the structural support element, the undulations defining the channels for flow of the fluid from the fluid inlet to the flow passage and/or from the flow passage to the fluid outlet.

8. The heat exchanger according to claim 1, wherein the structural support element comprises a first channel having a first width and a second channel having a second width.

9. The heat exchanger according to claim 8, wherein the first channel has a first length extending from a first edge of the structural support element defining the aperture to the peripheral edge of the structural support element, and the second channel has a second length extending from the first edge of the structural support element defining the aperture to the peripheral edge of the structural support element.

10. The heat exchanger according to claim 1, comprising a first channel having a first length extending from a first edge of the structural support element defining the aperture to the peripheral edge of the structural support element, and a second channel having a second length extending from the First edge of the structural support element defining the aperture to the peripheral edge of the structural support element.

11. The heat exchanger according to claim 1, further comprising a cavity, the cavity extending from an edge of the structural support element that defines the aperture towards the peripheral edge of the structural support element.

12. The heat exchanger according to claim 1, wherein the structural support element is a circular sealing disc.

13. The heat exchanger according to claim 1, wherein the structural support element is a longitudinal sealing disc.

14. The heat exchanger according to claim 1, wherein the heat exchanger is a battery cell cooler.

15. A heat exchanger module comprising:
a frame having a fluid inlet manifold and a fluid outlet manifold;
a battery coupled to the frame;
a heat exchanger as defined in claim 1 coupled to the frame; and
a seal positioned between the fluid inlet manifold and the plate pair of the heat exchanger defining the fluid inlet.

16. The heat exchanger module of claim 15, further comprising a second seal positioned between the fluid outlet manifold and the plate pair of the heat exchanger defining the fluid outlet.

17. A heat exchanger comprising:
a pair of complementary plates defining a plurality of fluid flow channels, the fluid flow channels being in fluid communication with a manifold inlet channel at a first end of the plurality of fluid flow channels and a manifold outlet channel at a second end of the plurality of fluid flow channels; and
a first longitudinal generally-U-shaped member positioned in the manifold inlet channel for providing structural support to the manifold inlet channel.

18. The heat exchanger according to claim 17, further comprising a second longitudinal generally-U-shaped member positioned in the manifold outlet channel for providing structural support to the manifold outlet channel.

19. The heat exchanger according to claim 17, wherein the first longitudinal generally-U-shaped member comprises a base and walls extending from the base of the longitudinal generally-U-shaped member, and
wherein the base contacts a first flat surface of the manifold inlet channel formed by one of the heat exchanger plates, and an edge of the walls distal from the base contacts a second flat surface of the manifold inlet channel formed by the other heat exchanger plates.

20. The heat exchanger according to claim 18, wherein the second longitudinal generally-U-shaped member comprises a base and walls extending from the base of the second longitudinal generally-U-shaped member, and
wherein the base contacts a first flat surface of the manifold outlet channel formed by one of the heat exchanger plates, and an edge of the walls distal from the base contacts a second flat surface of the manifold outlet channel formed by the other heat exchanger plates.

21. The heat exchanger according to claim 17, further comprising a lip extending from the walls of the longitudinal generally-U-shaped member.

22. The heat exchanger according to claim 21, wherein the lips extend outwardly and away from the walls.

23. The heat exchanger according to claim 22, wherein the distance between the ends of the lips approximates the width of the manifold inlet and/or outlet channel.

24. The heat exchanger according to claim 17, wherein the longitudinal generally-U-shaped member further comprises openings permitting flow of a fluid from the manifold inlet channel to the first end of the fluid flow channel, or flow of the fluid from the second end of the fluid flow channel to the manifold outlet channel.

25. The heat exchanger according to claim 17, further comprising a inlet tube having a radial seal coupled to an inlet and an outlet tube having a radial seal coupled to the outlet, wherein the pair of complementary plate pairs define the inlet and outlet, the inlet being in fluid communication with the manifold inlet channel and the outlet being in fluid communication with the manifold outlet channel.

* * * * *